(12) United States Patent
Jo et al.

(10) Patent No.: US 9,435,326 B2
(45) Date of Patent: *Sep. 6, 2016

(54) HYDRAULIC PRESSURE SUPPLY SYSTEM OF AUTOMATIC TRANSMISSION

(71) Applicant: Hyundai Motor Company, Seoul (KR)

(72) Inventors: Se Hwan Jo, Bucheon-si (KR); Jin Young Hwang, Busan (KR); Taehwan Wi, Bucheon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/081,781

(22) Filed: Nov. 15, 2013

(65) Prior Publication Data

US 2014/0294618 A1    Oct. 2, 2014

(30) Foreign Application Priority Data

Apr. 2, 2013 (KR) .................. 10-2013-0036027

(51) Int. Cl.
  *F16H 61/4017* (2010.01)
  *F04B 23/04* (2006.01)
  (Continued)

(52) U.S. Cl.
  CPC ............. *F04B 23/04* (2013.01); *F04B 49/002* (2013.01); *F04B 49/022* (2013.01);
  (Continued)

(58) Field of Classification Search
  CPC .... F01M 1/02; F01M 1/16; F01M 2001/123; Y02T 10/76; F16H 57/0401; F16H 2047/025; F16H 204/045; F16H 57/0441; F16H 61/0267; F16H 61/0021; F04B 23/04; F04B 49/002; F04B 2205/06; F04B 49/022; F04B 49/035; F04B 49/08

USPC ........... 417/278, 302, 307, 308, 364, 410.1, 417/440, 505; 123/1 A, 196 R, 196 S, 196 V, 123/196 W, 197.1, 198 P
See application file for complete search history.

(56) References Cited

U.S. PATENT DOCUMENTS 5,319,932 A * 6/1994 Roche .............................. 60/419
5,367,922 A * 11/1994 Jan ................................ 74/732.1
(Continued)

FOREIGN PATENT DOCUMENTS

JP        4333390 B2     7/2009
JP     2011-247290 A    12/2011
(Continued)

*Primary Examiner* — William H Rodriguez
*Assistant Examiner* — Stephen Mick
(74) *Attorney, Agent, or Firm* — Morgan, Lewis & Bockius LLP

(57) ABSTRACT

An automatic-transmission hydraulic pressure supply system includes a low-pressure hydraulic pump supplying low hydraulic pressure to a first low-pressure line, a low-pressure regulator valve recirculating through a first recirculation line a portion of the hydraulic pressure supplied through the first low-pressure line to regulate the hydraulic pressure of the first low-pressure line, and supplying the regulated hydraulic pressure to a low pressure portion through a second low-pressure line, a high-pressure hydraulic pump receiving a portion of the hydraulic pressure of the first low-pressure line, increasing and supplying the increased hydraulic pressure to a high pressure portion through a high-pressure line, and a high-pressure regulator valve recirculating a portion of the hydraulic pressure supplied through the high-pressure line through second and/or third recirculation lines, and supplying the regulated hydraulic pressure to the high pressure portion.

6 Claims, 2 Drawing Sheets

(51) Int. Cl.
  *F04B 49/00* (2006.01)
  *F04B 49/02* (2006.01)
  *F04B 49/035* (2006.01)
  *F04B 49/08* (2006.01)
  *F16H 61/00* (2006.01)
  *F16H 61/02* (2006.01)

(52) U.S. Cl.
  CPC ............ *F04B 49/035* (2013.01); *F04B 49/08* (2013.01); *F16H 61/0021* (2013.01); *F16H 61/0267* (2013.01); *F04B 2205/06* (2013.01)

(56) References Cited

U.S. PATENT DOCUMENTS

| | | | | |
|---|---|---|---|---|
| 6,050,918 | A | * | 4/2000 | Kuramoto ............... 477/157 |
| 6,139,469 | A | * | 10/2000 | Jang ........................ 477/130 |
| 2008/0234903 | A1 | * | 9/2008 | Satou ......................... 701/51 |

FOREIGN PATENT DOCUMENTS

| | | |
|---|---|---|
| JP | 2012-97813 A | 5/2012 |
| KR | 10-2012-0037623 A | 4/2012 |

* cited by examiner

HYDRAULIC PRESSURE SUPPLY SYSTEM OF AUTOMATIC TRANSMISSION

CROSS-REFERENCE TO RELATED APPLICATION

The present application claims priority of Korean Patent Application Number 10-2013-0036027 filed on Apr. 2, 2013, the entire contents of which application are incorporated herein for all purposes by this reference.

BACKGROUND OF INVENTION

1. Field of Invention

The present invention relates to a hydraulic pressure supply system of an automatic transmission for a vehicle. More particularly, the present invention relates to a hydraulic pressure supply system of an automatic transmission for a vehicle which can prevent unnecessary pressure override of a high pressure portion.

2. Description of Related Art

Recently, vehicle makers direct all their strength to improving fuel economy due to worldwide high oil prices and strengthening of exhaust gas regulations. Improvement of fuel economy may be achieved by improving power delivery efficiency, and the improvement of the power delivery efficiency may be achieved by minimizing unnecessary power consumption of a hydraulic pump.

A recent automatic transmission is provided with a low-pressure hydraulic pump and a high-pressure hydraulic pump so as to improve fuel economy. Therefore, hydraulic pressure generated by the low-pressure hydraulic pump is supplied to a low pressure portion (i.e., a torque converter, a cooling device, and a lubrication device), and hydraulic pressure generated by the high-pressure hydraulic pump is supplied to a high pressure portion (i.e., friction members selectively operated when shifting).

In further detail, general hydraulic pressure of the automatic transmission is generated for the low pressure portion (i.e., generated by the low-pressure hydraulic pump), and hydraulic pressure demanded by the high pressure portion is generated by the high-pressure hydraulic pump and then is supplied to the high pressure portion.

That is, the low hydraulic pressure generated by the low-pressure hydraulic pump is controlled by the low-pressure regulator valve and is supplied to the low pressure portion such as the torque converter, the cooling device, and the lubrication device, and the high hydraulic pressure generated by the high-pressure hydraulic pump is controlled by the high-pressure regulator valve and is supplied to the high pressure portion for operating the friction members related to shifting.

However, because the hydraulic pressure supplied to the high pressure portion is controlled only by the high-pressure regulator valve, unnecessary pressure override may occur according to a conventional hydraulic pressure supply system.

Particularly, if exhaust characteristics of an orifice disposed on a recirculation line of the high-pressure regulator valve is deteriorated at a low temperature or a target pressure of the high pressure portion is lowered and exhaust amount increases temporarily, pressure override may occur at the high pressure portion during delay in speed reduction of a motor. If pressure override occurs at the high pressure portion, friction members provided at the high pressure portion may be out of order and durability of the high pressure portion may be deteriorated.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a hydraulic pressure supply system of an automatic transmission for a vehicle having advantages of improving durability by preventing occurrence of unnecessary pressure override at a high pressure portion.

A hydraulic pressure supply system of an automatic transmission for a vehicle according to various aspects of the present invention may include: a low-pressure hydraulic pump generating a low hydraulic pressure and supplying the low hydraulic pressure to a first low-pressure line; a low-pressure regulator valve recirculating through a first recirculation line a portion of the hydraulic pressure supplied through the first low-pressure line to regulate the hydraulic pressure of the first low-pressure line, and supplying the regulated hydraulic pressure to a low pressure portion through a second low-pressure line; a high-pressure hydraulic pump receiving a portion of the hydraulic pressure of the first low-pressure line, increasing it to a high hydraulic pressure, and supplying the increased hydraulic pressure to a high pressure portion through a high-pressure line; and a high-pressure regulator valve recirculating a portion of the hydraulic pressure supplied through the high-pressure line through a second recirculation line or through second and third recirculation lines according to a strength of the hydraulic pressure supplied through the high-pressure line to regulate the hydraulic pressure of the high-pressure line, and supplying the regulated hydraulic pressure to the high pressure portion.

The low-pressure hydraulic pump may be driven by a low-pressure motor and the high-pressure hydraulic pump may be driven by a high-pressure motor. The low-pressure hydraulic pump may be connected to an oil pan through an input line, and the first recirculation line may be arranged to recirculate the hydraulic pressure of the low-pressure regulator valve to the input line.

The high-pressure regulator valve may recirculate the hydraulic pressure through the second recirculation line if the hydraulic pressure of the high-pressure line is lower than a predetermined value, and the high-pressure regulator valve may recirculate the hydraulic pressure through the second and third recirculation lines if the hydraulic pressure of the high-pressure line is higher than or equal to the predetermined value.

The second recirculation line and the third recirculation line may be arranged to recirculate the hydraulic pressure of the high-pressure regulator valve to the first low-pressure line. The second recirculation line may be provided with an orifice and a pressure sensor may be mounted between the orifice and the high-pressure regulator valve.

The high-pressure regulator valve may include: a valve body having a first port receiving the hydraulic pressure of the high-pressure line, a second port receiving the hydraulic pressure of the high-pressure line as a control pressure, a third port selectively supplying a portion of the hydraulic pressure supplied to the first port to the second recirculation line, a fourth port selectively supplying a portion of the hydraulic pressure supplied to the first port to the third recirculation line, and a fifth port disposed at an opposite side to the second port and receiving a control pressure of a solenoid valve; and a valve spool having a first land operated by the hydraulic pressure supplied to the second port and controlling an opening area of the third port, a second land dividing the first port to supply the hydraulic pressure supplied to the first port to the third port and the fourth port, and a third land selectively opening or closing the fourth port.

The high-pressure regulator valve may further include an elastic member disposed between the third land and the valve body.

A hydraulic pressure supply system of an automatic transmission for a vehicle according to various other aspects of the present invention may generate a low hydraulic pressure and a high hydraulic pressure using an oil stored in an oil pan and may supply the low hydraulic pressure and the high hydraulic pressure respectively to a low pressure portion and a high pressure portion.

The hydraulic pressure supply system may include: a low-pressure hydraulic pump generating the low hydraulic pressure by using the oil stored in the oil pan and supplying the low hydraulic pressure to the low pressure portion; a high-pressure hydraulic pump generating the high hydraulic pressure by using the low hydraulic pressure and supplying the high hydraulic pressure to the high pressure portion; and a high-pressure regulator valve recirculating a portion of the hydraulic pressure supplied from the high-pressure hydraulic pump through one or two hydraulic lines according to a strength of the hydraulic pressure supplied from the high-pressure hydraulic pump to regulate the high hydraulic pressure supplied to the high pressure portion.

The low-pressure hydraulic pump may be driven by a low-pressure motor and the high-pressure hydraulic pump may be driven by a high-pressure motor.

The high-pressure regulator valve may recirculate the hydraulic pressure supplied from the high-pressure hydraulic pump through one hydraulic line if the hydraulic pressure supplied from the high-pressure hydraulic pump is lower than a predetermined value, and the high-pressure regulator valve may recirculate the hydraulic pressure supplied from the high-pressure hydraulic pump through two hydraulic lines if the hydraulic pressure supplied from the high-pressure hydraulic pump is higher than or equal to the predetermined value.

The hydraulic pressure supply system may further include a low-pressure regulator valve recirculating a portion of the low hydraulic pressure supplied from the low-pressure hydraulic pump to regulate the low hydraulic pressure, and supplying the regulated low hydraulic pressure to the low pressure portion.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
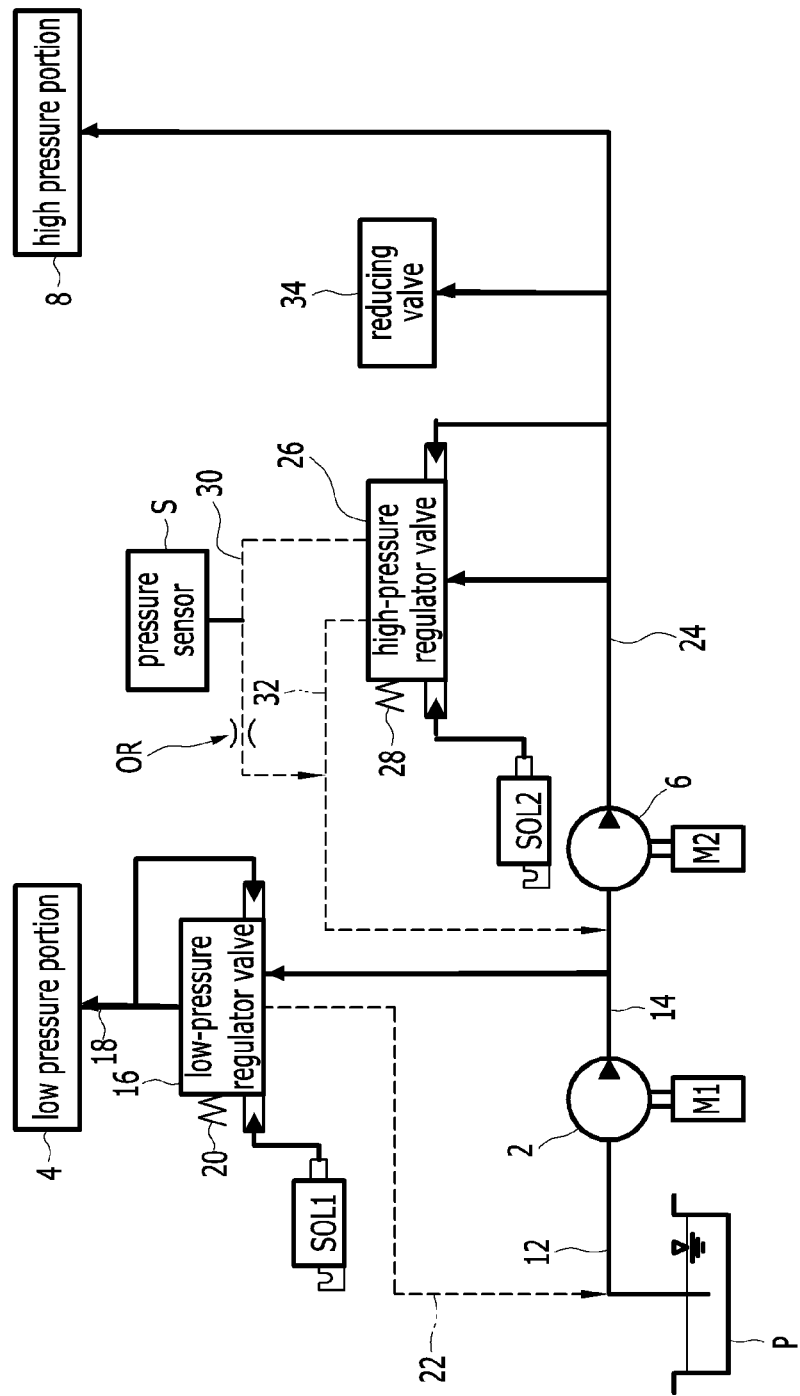
FIG. 1 is a schematic diagram of a hydraulic pressure supply system of an automatic transmission according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Description of components that are not necessary for explaining the illustrated exemplary embodiments will be omitted, and the same constituent elements are denoted by the same reference numerals in this specification. In the detailed description, ordinal numbers are used for distinguishing constituent elements having the same terms, and have no specific meanings.

FIG. 1 is a schematic diagram of a hydraulic pressure supply system of an automatic transmission according to various embodiments of the present invention. Referring to FIG. 1, a hydraulic pressure supply system is adapted or configured to supply a low hydraulic pressure generated by a low-pressure hydraulic pump 2 to a low pressure portion 4 such as a torque converter, a cooling portion, and a lubrication portion and to supply a high hydraulic pressure generated by a high-pressure hydraulic pump 6 to a high pressure portion 8 for operating friction members related to shifting.

The low hydraulic pressure is a lower pressure facilitating operation of the torque converter (T/C) and cooling and lubrication, and the high hydraulic pressure is a high pressure facilitating operation of a plurality of friction members.

The low-pressure hydraulic pump 2 is driven by a low-pressure motor M1 and the high-pressure hydraulic pump 6 is driven by a high-pressure motor M2. In addition, the low-pressure motor M1 and the high-pressure motor M2 are controlled by a transmission control unit to drive the low-pressure hydraulic pump 2 and the high-pressure hydraulic pump 6 independently.

The low-pressure hydraulic pump 2 receives an oil stored in an oil pan P through an input line 12 and generates the low hydraulic pressure. The low hydraulic pressure generated by the low-pressure hydraulic pump 2 is discharged to a first low-pressure line 14. The hydraulic pressure supplied to the first low-pressure line 14 is regulated to be a stable hydraulic pressure by a low-pressure regulator valve 16, and the regulated hydraulic pressure is supplied to the low pressure portion 4 through a second low-pressure line 18.

The low-pressure regulator valve 16 is a spool valve. The hydraulic pressure of the second low-pressure line 18 is applied to a side of the low-pressure regulator valve 16 as a control pressure, and elastic force of an elastic member 20 and a control pressure of a first solenoid valve SOL1 is applied to the other side of the low-pressure regulator valve 16.

Therefore, the low-pressure regulator valve 16 recirculates a portion of the hydraulic pressure supplied through the first low-pressure line 14 to the input line 12 through a first recirculation line 22 by the hydraulic pressure of the second low-pressure line 18, the elastic force of the elastic member 20 and the control pressure of the first solenoid valve SOL1 to regulate the hydraulic pressure.

The high-pressure hydraulic pump 6 receives a portion of the hydraulic pressure of the first low-pressure line 14, generates the high hydraulic pressure, and discharges the high hydraulic pressure to a high-pressure line 24. The hydraulic pressure supplied to the high-pressure line 24 is regulated to be a stable hydraulic pressure by a high-pressure regulator valve 26, and the regulated hydraulic pressure is supplied to the high pressure portion 8.

The high-pressure regulator valve 26 is a spool valve. The hydraulic pressure of the high-pressure line 24 is applied to a side of the high-pressure regulator valve 26 as a control pressure, and elastic force of an elastic member 28 and a control pressure of a second solenoid valve SOL2 is applied to the other side of the high-pressure regulator valve 26.

Therefore, the high-pressure regulator valve 26 recirculates a portion of the hydraulic pressure supplied through the high-pressure line 24 to the first low-pressure line 14 through a second recirculation line 30 or through second and third recirculation lines 30 and 32 by the hydraulic pressure of the high-pressure line 24, the elastic force of the elastic member 28 and the control pressure of the second solenoid valve SOL2 to regulate the hydraulic pressure.

An orifice OR is mounted on the second recirculation line 30 and a pressure sensor S is mounted between the orifice OR and the high-pressure regulator valve 26. Because oil amount recirculated to the first low-pressure line 14 through the second recirculation line 30 is controlled to be constant by the orifice OR, the oil amount in the first low-pressure line 14 does not change greatly and becomes stable. In addition, the oil amount in the second recirculation line 30 does not change greatly and is maintained.

The pressure sensor S detects the hydraulic pressure of the stable oil amount in the second recirculation line 30 and transmits information corresponding thereto to the transmission control unit. In this case, the transmission control unit controls rotation speeds of the low-pressure motor M1 and the high-pressure motor M2 independently according to the pressure information detected by the pressure sensor S.

Reference numeral 34 in FIG. 1 represents a reducing valve. The reducing valve 34 lowers the hydraulic pressure supplied through the high-pressure line 24 and supplies the lowered hydraulic pressure to the first and second solenoid valves SOL1 and SOL2 as control pressures.

Figure 2:
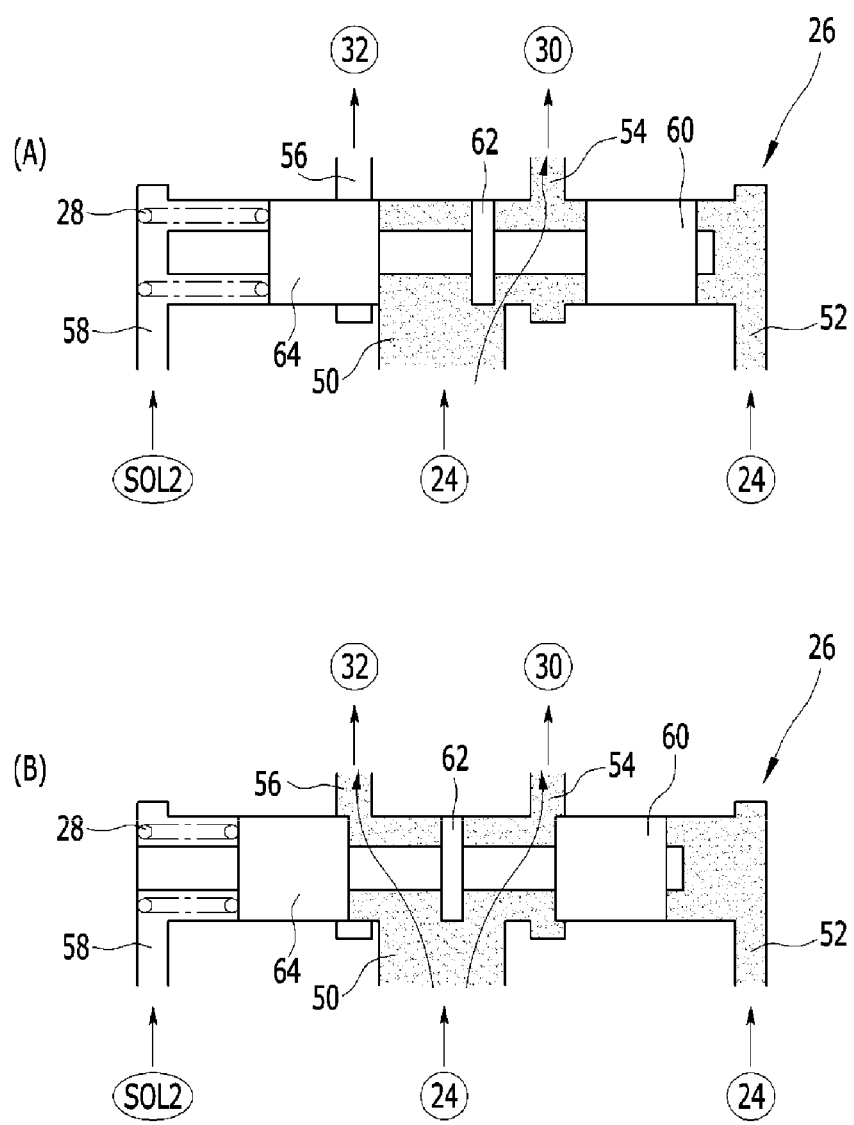
FIG. 2 is a cross-sectional view of a high-pressure regulator valve used in a hydraulic pressure supply system of an automatic transmission according to the present invention.

FIG. 2 is a cross-sectional view of a high-pressure regulator valve used in a hydraulic pressure supply system of an automatic transmission according to various embodiments of the present invention. Referring to FIG. 2, the high-pressure regulator valve 26 is the spool valve and includes a valve body and a valve spool.

The valve body includes a first port 50 receiving the hydraulic pressure of the high-pressure line 24, a second port 52 receiving the hydraulic pressure of the high-pressure line 24 as the control pressure, a third port 54 selectively supplying a portion of the hydraulic pressure supplied to the first port 50 to the second recirculation line 30, a fourth port 56 selectively supplying a portion of the hydraulic pressure supplied to the first port 50 to the third recirculation line 32, and a fifth port 58 disposed on an opposite side to the second port 52 and receiving the control pressure of the second solenoid valve SOL2.

The valve spool includes a first land 60 operated by the hydraulic pressure supplied to the second port 52 and controlling an opening area of the third port 54, a second land 62 formed to be thin to supply the hydraulic pressure supplied to the first port 50 to the third port 54 and the fourth port 56 and dividing the first port 50, and a third land 64 selectively opening or closing the fourth port 56. The elastic member 28 is disposed between the third land 64 and the valve body.

If the control pressure supplied through the second port 52 is lower than a predetermined value, the high-pressure regulator valve 26 connects the first port 50 only to the third port 54, as shown in FIG. 2A. Therefore, the portion of the hydraulic pressure supplied to the first port 50 is exhausted through the second recirculation line 30. The oil amount exhausted to the second recirculation line 30 is stabilized by the orifice OR and is recirculated to the first low-pressure line 14.

If the control pressure supplied through the second port 52 is higher than or equal to the predetermined value, the high-pressure regulator valve 26 connects the first port 50 to the third port 54 and the fourth port 56 simultaneously, as shown in FIG. 2B. Therefore, the portion of the hydraulic pressure supplied to the first port 50 is exhausted to the second and third recirculation lines 30 and 32 through the third port 54 and the fourth port 56.

Because the third recirculation line 32 is connected to the first low-pressure line 14 without any flow resistance therebetween, the hydraulic pressure is exhausted quickly and the hydraulic pressure of the high-pressure line 24 is lowered quickly. Therefore, unnecessary pressure override of the high pressure portion 8 may be prevented.

That is, even though the high hydraulic pressure higher than the predetermined value is formed at the high-pressure line 24 due to deterioration of exhaust characteristic of the orifice OR on the second recirculation line 30 at a low temperature or delay in speed reduction of the high-pressure motor M2, the hydraulic pressure can be exhausted through the second and third recirculation lines 30 and 32 quickly. Therefore, unnecessary pressure override of the high pressure portion 8 may be prevented. In addition, even if surplus oil amount is excessively generated at the high pressure portion 8 due to change of line pressure after completion of the shifting, the surplus oil amount can be quickly recirculated.

Since unnecessary pressure override of the high pressure portion 8 is prevented, failure of the high pressure portion 8 may be prevented and durability may be improved.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hydraulic pressure supply system of an automatic transmission for a vehicle, comprising:
   a low-pressure hydraulic pump receiving oil from an oil pan through an input line, generating a low hydraulic pressure to the oil and supplying the oil of the low hydraulic pressure to a first low-pressure line;
   a low-pressure regulator valve connected to the first low-pressure line, recirculating through a first recirculation line a portion of the oil of the low hydraulic pressure supplied through the first low-pressure line directly to the input line to regulate the low hydraulic pressure of the first low-pressure line, and supplying the regulated low hydraulic pressure to a low pressure portion through a second low-pressure line;
   a high-pressure hydraulic pump connected to the first low-pressure line, receiving a portion of the oil of the low hydraulic pressure in the first low-pressure line, increasing the low hydraulic pressure to a high hydraulic pressure, and supplying the oil of the increased hydraulic pressure to a high pressure portion through a high-pressure line; and a high-pressure regulator valve connected to the high-pressure line, recirculating a portion of the oil of the high hydraulic pressure supplied through the high-pressure line directly to the first low-pressure line through a second recirculation line, selectively recirculating a portion of the oil of the high hydraulic pressure supplied through the high-pressure line to the second recirculation line through a third recirculation line, and supplying the oil of the high hydraulic pressure regulated through the high-pressure regulator valve to the high pressure portion, wherein the third recirculation line is selectively connected to the second recirculation line according to a strength of the high hydraulic pressure of the oil in the high-pressure line.

2. The hydraulic pressure supply system of claim 1, wherein the low-pressure hydraulic pump is driven by a low-pressure motor and the high-pressure hydraulic pump is driven by a high-pressure motor.

3. The hydraulic pressure supply system of claim 1, wherein the high-pressure regulator valve recirculates the oil of the high hydraulic pressure through the second recirculation line if the high hydraulic pressure of the high-pressure line is lower than a predetermined value, and recirculates the oil of the high hydraulic pressure through the second and third recirculation lines if the high hydraulic pressure of the high-pressure line is higher than or equal to the predetermined value.

4. The hydraulic pressure supply system of claim 3, wherein the second recirculation line is provided with an orifice and a pressure sensor is mounted between the orifice and the high-pressure regulator valve.

5. The hydraulic pressure supply system of claim 1, wherein the high-pressure regulator valve comprises:

a valve body having a first port receiving the high hydraulic pressure of the high-pressure line, a second port receiving the high hydraulic pressure of the high-pressure line as a control pressure, a third port selectively supplying a portion of the oil of the high hydraulic pressure supplied to the first port to the second recirculation line, a fourth port selectively supplying a portion of the oil of the high hydraulic pressure supplied to the first port to the third recirculation line, and a fifth port disposed at an opposite side to the second port and receiving a control pressure of a solenoid valve; and a valve spool having a first land operated by the high hydraulic pressure supplied to the second port and controlling an opening area of the third port, a second land dividing the first port to supply the high hydraulic pressure supplied to the first port to the third port and the fourth port, and a third land selectively opening or closing the fourth port.

6. The hydraulic pressure supply system of claim 5, wherein the high-pressure regulator valve further comprises an elastic member disposed between the third land and the valve body.

* * * * *